US008649467B2

(12) United States Patent
Wei et al.

(10) Patent No.: US 8,649,467 B2
(45) Date of Patent: Feb. 11, 2014

(54) MULTI-SYMBOL CHANNEL ESTIMATION METHOD FOR ESTIMATING CHANNEL RESPONSE IN A MULTI-CARRIER MODULATION SYSTEM

(75) Inventors: Shyue-Win Wei, Hsinchu (TW); Yih-Haw Jan, Miaoli (TW); Ting-Ru Yan, New Taipei (TW)

(73) Assignee: National Chi Nan University, Puli, Nantou (TW)

( * ) Notice: Subject to any disclaimer, the term of this patent is extended or adjusted under 35 U.S.C. 154(b) by 273 days.

(21) Appl. No.: 13/136,048

(22) Filed: Jul. 20, 2011

(65) Prior Publication Data

US 2012/0076214 A1    Mar. 29, 2012

(30) Foreign Application Priority Data

Sep. 24, 2010    (TW) .............................. 99132355 A (51) Int. Cl.
*H04L 27/06*    (2006.01)
(52) U.S. Cl.
USPC ........... 375/340; 375/267; 375/229; 375/260; 375/344; 455/67.14
(58) Field of Classification Search
USPC ....................................................... 375/340
See application file for complete search history.

(56) References Cited

U.S. PATENT DOCUMENTS

| 2006/0285601 | A1* | 12/2006 | Julian et al. ................... 375/260 |
| 2007/0293172 | A1* | 12/2007 | Shi et al. ..................... 455/187.1 |
| 2010/0203841 | A1* | 8/2010 | Hwang et al. .............. 455/67.14 |

* cited by examiner

*Primary Examiner* — Lihong Yu
(74) *Attorney, Agent, or Firm* — Kilpatrick Townsend & Stockton LLP (57) ABSTRACT

A method of multi-symbol channel estimation for estimating channel response to a plurality of transmission symbols within an observation window transmitted through a time-varying channel in a multi-carrier modulation system is provided. The method is to be implemented using a channel estimation device, and includes the steps of: obtaining a window pilot receive vector according to a part of elements of each of receive symbols corresponding to pilots in a corresponding one of the transmission symbols; computing a window pilot channel trans form matrix based upon the pilots in the transmission symbols; computing an estimated value of a polynomial coefficient vector based upon the window pilot receive vector and the window pilot channel transform matrix; and for each of the transmission symbols, computing a plurality of estimated values of channel response associated with possible transmission paths in the time-varying channel according to the estimated value of the polynomial coefficient vector.

8 Claims, 4 Drawing Sheets

MULTI-SYMBOL CHANNEL ESTIMATION METHOD FOR ESTIMATING CHANNEL RESPONSE IN A MULTI-CARRIER MODULATION SYSTEM

CROSS-REFERENCE TO RELATED APPLICATION

This application claims priority to Taiwanese Application No. 099132355, filed Sep. 24, 2010, the disclosure of which is incorporated herein by reference.

BACKGROUND OF THE INVENTION

1. Field of the Invention

The present invention relates to a channel estimation method, more particularly to a multi-symbol channel estimation method for estimating channel response in a multi-carrier modulation system.

2. Description of the Related Art

Generally, a multi-carrier modulation (MCM) system, such as an orthogonal frequency division multiplexing (OFDM) system, is used for broadband data transmission. In the OFDM system, interference attributed to multi-path channels is effectively resolved through transmission of orthogonal long symbols. However, orthogonality of the symbols will fail when the OFDM system is used in fast time-varying selective fading channels, especially under a high-mobility environment. Since enhancement of Doppler effect will increase a time-varying rate of a time-varying channel, and the faster time-varying rate will result in the more obvious failure of the orthogonality among subcarriers within each of the symbols, a channel matrix representing the time-varying channel will no longer be a diagonal matrix. Thus, use of a conventional one-tap frequency-domain equalizer for estimating channel response usually results in relatively worse performance of the system.

Currently, there are many techniques used for estimating channel response in the MCM system, and various methods of insertion of pilots are used for facilitating the estimation of the channel response. For example, S. Chen et al. proposed a method of channel estimation (referred to as Chen method hereafter) in "Intercarrier interference suppression and channel estimation for OFDM systems in time-varying frequency-selective fading channels," *IEEE Trans. Consumer electron*, Vol. 50, No. 2, pages 429-435; Y. Mostofi et al. proposed a method of channel estimation (referred to as Yasamin method hereafter) in "ICI mitigation for pilot-aided OFDM mobile systems," *IEEE Trans. Wireless Commun.*, Vol. 4, No. 2, pages 765-774; Huang-Chang Lee et al. proposed a method of symmetric training-symbol-based channel estimation in "Channel estimation for OFDM system with two training symbols aided and polynomial fitting," IEEE Transactions on Commun., Vol. 58, No. 3, pages 733-736; and Chao-Wei Chen et al. proposed a method of asymmetric training-symbol-based channel estimation in "Channel estimation for OFDM systems with asymmetric pilot symbols," IEEE Wireless Communications and Networking Conference, April 2010, pages 1-5.

Chen method and Yasamin method involve insertion of the pilots into certain subcarriers in a frequency domain. Chen method utilizes a single symbol to serve as an observation window to estimate the channel response. Namely, Chen method is a single-symbol-based channel estimation method, and can only be used for estimating the channel response to the single symbol during transmission using a set of first-order polynomial interpolations. Therefore, there is a requirement of a relatively greater number of pilots within the symbol, that is to say, high overhead is required for implementing Chen method since Chen method utilizes the first-order polynomial interpolations. On the other hand, Yasamin method involves messages interpolation in cyclic prefixes of adjacent symbols, or uses pilots at symbol midpoint of adjacent symbols for estimating channel response using a first-order polynomial. As a result, a number of the pilots is relatively smaller, and is limited to a certain number corresponding to a number of the subcarriers. For the above reasons, the channel response estimated using Chen method or Yasamin method under a high-mobility environment is relatively inaccurate since these two methods merely use the first-order polynomial during estimation of the channel response to a fast time-varying channel.

The method of symmetric training-symbol-based channel estimation involves insertion of a pair of training symbols (i.e., full-overhead pilots) respectively before and after a set of symbols in an observation window in a-frequency domain. Then, the set of symbols between the two training symbols in the observation window are data symbols. The method of asymmetric training-symbol-based channel estimation is similar to the method of symmetric training-symbol-based channel estimation. In the method of asymmetric training-symbol-based channel estimation, one of the training symbols is a partial-overhead pilot. Although these two methods are capable of enhancing the accuracy of the estimated channel response, at the same time, pilot overhead is significantly increased and computation is complicated. As a result, transmission efficiency is reduced.

SUMMARY OF THE INVENTION

Therefore, an object of the present invention is to provide a method of multi-symbol channel estimation, which is practical under a high-mobility environment and is capable of maintenance of channel transmission efficiency, for a multi-carrier modulation (MCM) system.

Accordingly, a method of multi-symbol channel estimation of the present invention is used for estimating channel response to a plurality of transmission symbols within an observation window transmitted through a time-varying channel in a MCM system. Each of the transmission symbols includes a plurality of pilots. The method is to be implemented using a channel estimation device that is configured to receive a plurality of receive symbols as a result of transmission of the transmission symbols through the time-varying channel. Each of the receive symbols has a plurality of elements. The method comprises the steps of:

a) configuring the channel estimation device to obtain a window pilot receive vector according to apart of the elements of each of the receive symbols that correspond to the pilots in a corresponding one of the transmission symbols;

b) configuring the channel estimation device to compute a window pilot channel transform matrix based upon the pilots in the transmission symbols;

c) configuring the channel estimation device to compute an estimated value of a polynomial coefficient vector based upon the window pilot receive vector obtained in step a) and the window pilot channel transform matrix obtained in step b); and d) for each of the transmission symbols, configuring the channel estimation device to compute a plurality of estimated values of channel response associated with possible transmission paths in the time-varying channel of the MCM system according to the estimated value of the polynomial coefficient vector.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
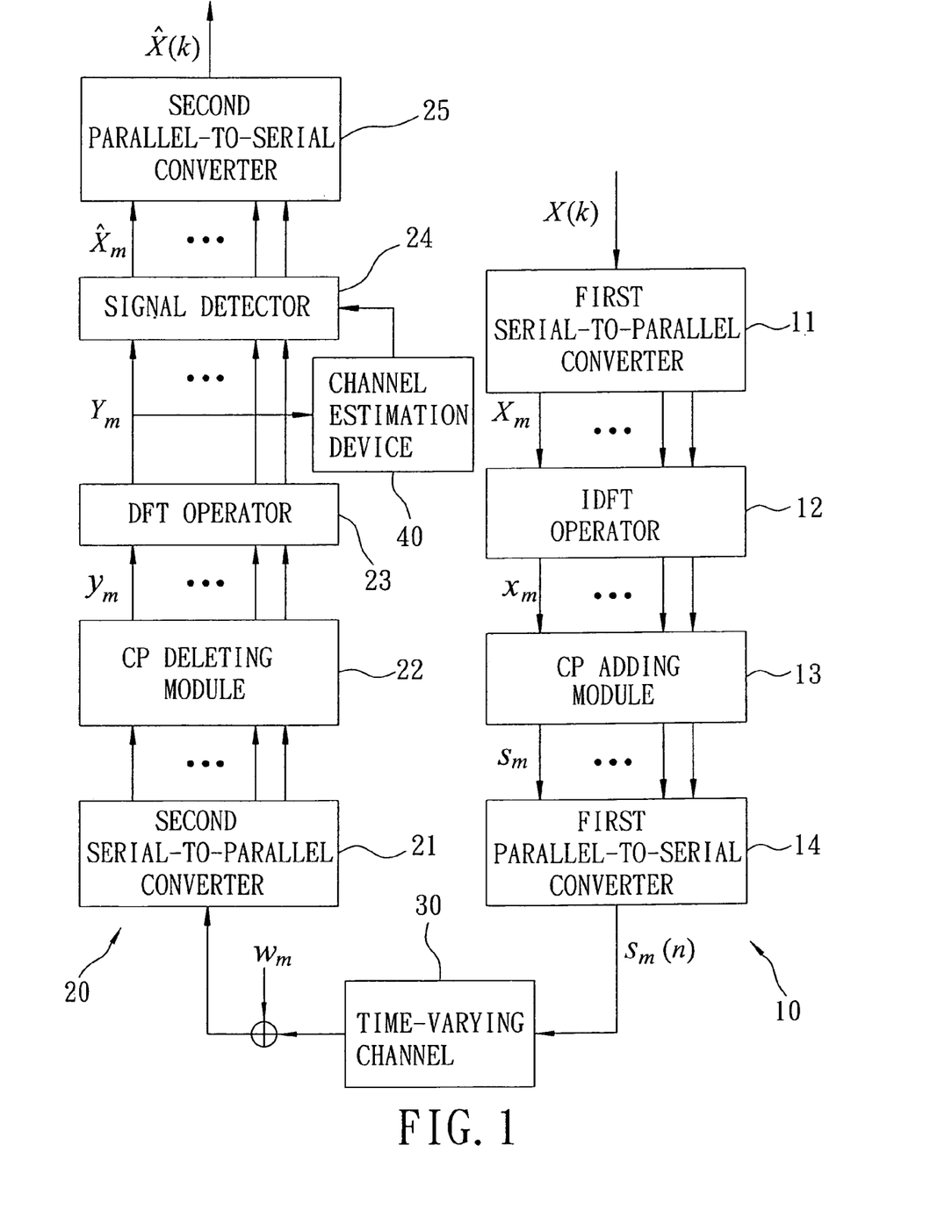
FIG. 1 is a block diagram of an orthogonal frequency division multiplexing system.

Referring to FIG. 1, an orthogonal frequency division multiplexing (OFDM) system 1 includes a transmitting end 10 and a receiving end 20. Regarding the modulation theory of the OFDM system 1, the OFDM system 1 is adapted to divide a broadband channel into a number N of subcarriers that are orthogonal with each other using Discrete Fourier Transform/Inverse Discrete Fourier Transform (DFT/IDFT). In order to maintain orthogonality among the subcarriers, it is required to add a certain number of cyclic prefixes (CP) to each of OFDM symbols (i.e., transmission symbols) for eliminating inter-symbol interference. In particular, a length of each of the cyclic prefixes must be greater than a delay spread of a time-varying channel 30 in the OFDM system 1. In the following description of this embodiment, each of several reference symbols that indicate respective variables is attached with an index m corresponding to each of the transmission symbols so as to facilitate the description of modulation, transmission, interference and demodulation of the transmission symbols.

The transmitting end 10 of the OFDM system 1 includes a first serial-to-parallel converter 11, an IDFT operator 12, a CP adding module 13, and a first parallel-to-serial converter 14. The receiving end 20 of the OFDM system 1 includes a second serial-to-parallel converter 21, a CP deleting module 22, a DFT operator 23, a signal detector 24, and a second parallel-to-serial converter 25.

During transmission of a serial transmission signal X(k) having a plurality of data sets at the transmitting end 10 of the OFDM system 1, the first serial-to-parallel converter 11 is configured to receive the serial transmission signal X(k). Further, the first serial-to-parallel converter 11 is operable to convert each continuous N ones of the data sets in the serial transmission signal X(k) into a frequency-domain transmission symbol $X_m$ that is allocated to the number N of the subcarriers. The index m is a positive integer ranging from 0 to M−1 and indicates an $m^{th}$ one of the frequency-domain transmission symbols $X_0$ to $X_{M-1}$, and M is a number of the frequency-domain transmission symbols $X_0$ to $X_{M-1}$. Then, the IDFT operator 12 is operable to convert each of the frequency-domain transmission symbols $X_0$ to $X_{M-1}$ into a corresponding time-domain transmission symbol $x_m$. The CP adding module 13 is operable to add the certain number of CP to each of the time-domain transmission symbols $x_0$ to $X_{M-1}$ to result in a corresponding transmit symbol $s_m$. The first parallel-to-serial converter 14 is operable to convert each of the transmit symbols $s_0$ to $s_{M-1}$ into a corresponding transmit signal $S_m(n)$, and to send all of the transmit signals $S_0(n)$ to $S_{M-1}(n)$ to the time-varying channel 30 having a number L of possible transmission paths.

The transmit signals $S_0(n)$ to $S_{M-1}(n)$ are transmitted through the time-varying channel 30 with a noise $w_m$, and are received by the receiving end 20 of the OFDM system 1. The second serial-to-parallel converter 21 and the CP deleting module 22 are operable respectively to implement serial-to-parallel conversion and CP deletion to each of the transmit signals $S_0(n)$ to $S_{M-1}(n)$, which have been transmitted through the time-varying channel 30, so as to obtain a corresponding time-domain receive symbol $y_m$. The DFT operator 23 is operable to convert each of the time-domain receive symbols $y_0$ to $y_{M-1}$ into a corresponding frequency-domain receive symbol $Y_m$. The signal detector 24 is operable to obtain an estimated value of the frequency-domain transmission symbol $\hat{X}_m$ according to a corresponding one of the frequency-domain receive symbols $Y_0$ to $Y_{M-1}$. The second parallel-to-serial converter 25 is operable to convert the estimated values of the frequency-domain transmission symbols $\hat{X}_0$ to $\hat{X}_{M-1}$ into an estimated value of the serial transmission signal $\hat{X}(k)$.

The preferred embodiment of a method of multi-symbol channel estimation according to the present invention is implemented using a channel estimation device 40 for estimating channel response to a plurality of frequency-domain transmission symbols $X_m$ (m=0, 1, . . . , M−1) within an observation window that are transmitted through a time-varying channel 30 in a multi-carrier modulation (MCM) system (such as the above-mentioned OFDM system 1). The channel estimation device 40 is coupled to the OFDM system 1, and is configured to receive a plurality of frequency-domain receive symbols $Y_m$ (m=0, 1, . . . , M−1) as a result of transmission of the frequency-domain transmission symbols $X_m$ through the time-varying channel 30.

In this embodiment, the M frequency-domain transmission symbols $X_0$ to $X_{M-1}$ is considered as an observation window during transmission. In this observation window, each of the frequency-domain transmission symbols $X_0$ to $X_{M-1}$ includes a number $N_P$ of pilots. The pilots are allocated to $N_P$ ones of the N subcarriers in a random manner, and the remaining N−$N_P$ subcarriers are used for data transmission. The channel estimation device 40 is operable to perform the method of multi-symbol channel estimation to estimate the channel response to the frequency-domain transmission symbols $X_0$ to $X_{M-1}$ through the time-varying channel 30 by comparing the pilots in each of the frequency-domain transmission symbols $X_0$ to $X_{M-1}$ with the frequency-domain receive symbols $Y_0$ to $Y_{M-1}$. In particular, the pilots are known to the channel estimation device 40 since the channel estimation device 40 is specified to the pilots.

It should be noted that, in an observation window, a ratio of a number of the pilots to a number of the subcarriers is defined as a pilot overhead. The pilot overhead reflects transmission efficiency, and a lower pilot overhead is associated with greater transmission efficiency. In this embodiment, the number M of the frequency-domain transmission symbols $X_0$ to $X_{M-1}$ and the number $N_P$ of the subcarriers allocated with the pilots are adjustable. Further, positions of the pilots in the subcarriers are also adjustable. Thus, the method of multi-symbol channel estimation is capable of effective estimation of channel response. The following description is provided to explain the basic theory related to operation of the ODFM system and the channel estimation device 40 of this embodiment.

It is assumed that the channel response of an $m^{th}$ one of the frequency-domain transmission symbols $X_m$ to an $l^{th}$ one of the transmission paths in the time-varying channel 30 is expressed as $g_m(k,l)$, where m=0, 1, ..., M-1, k=0, 1, ..., N-1, and l=0, 1, ... L-1. In particular, k is a $k^{th}$ one of sampling indices associated with the frequency-domain transmission symbols $X_0$ to $X_{M-1}$, and l indicates a corresponding one of the transmission paths in the time-varying channel 30.

Therefore, a relation between an $m^{th}$ one of the time-domain transmission symbols $x_m$ transmitted through the time-varying channel 30 and a corresponding $m^{th}$ one of the time-domain receive symbols $y_m$ can be expressed as Equation (1).

$$y_m = G_m x_m + w_m \quad (1)$$

In Equation (1), $G_m$ is a N×N time-domain channel matrix, and $w_m$ is an additive white Gaussian noise (AWGN). A relation between the time-domain channel matrix $G_m$ and the channel response $g_m(k,l)$ is expressed as Equation (2)

$$G_m = \begin{bmatrix} g_m(0,0) & 0 & \cdots & 0 & g_m(0,L-1) & g_m(0,L-2) & \cdots & g_m(0,1) \\ g_m(1,1) & g_m(1,0) & 0 & \cdots & 0 & g_m(1,L-1) & \cdots & g_m(1,2) \\ \vdots & \ddots & \ddots & \ddots & & & & \vdots \\ 0 & \cdots & 0 & g_m(N-1,L-1) & g_m(N-1,L-2) & \cdots & \cdots & g_m(N-1,0) \end{bmatrix} \quad (2)$$

For analyzing signals in a frequency domain, an N×N Fourier transform matrix F is used, and matrix elements thereof are expressed as $$F(r,c) = \frac{1}{\sqrt{N}} \exp\left(-j2\pi \frac{r \cdot c}{N}\right), \quad (3)$$

where r indicates a row of the Fourier transform matrix F and ranges from 0 to N-1, and c indicates a column of the Fourier transform matrix F and ranges from 0 to N-1. Further, matrix elements of an N×N inverse Fourier transform matrix are expressed as $$F^{-1}(r,c) = \frac{1}{\sqrt{N}} \exp\left(j2\pi \frac{r \cdot c}{N}\right). \quad (4)$$

An $m^{th}$ one of the frequency-domain transmission symbols $Y_m$ can obtained by converting the $m^{th}$ one of the time-domain receive symbols $y_m$ of Equation (1) with the Fourier transform matrix F. The $m^{th}$ one of the frequency-domain transmission symbols $Y_m$ can be expressed as $$Y_m = H_m X_m + W_m, \quad (5)$$

where, $Y_m = F y_m$, $H_m = F G_m F^{-1}$, $X_m = F x_m$, $W_m = F w_m$, and $H_m$ is defined as an N×N frequency-domain channel matrix.

It is assumed that the channel response $g_m(k,l)$ of the $m^{th}$ one of the frequency-domain transmission symbols $X_m$ to the $l^{th}$ transmission path can be approximated using a $Q^{th}$ order polynomial. The $Q^{th}$ order polynomial is expressed as $$g_m(k,l) \approx \sum_{q=0}^{Q} c_{q,l} k^q, \quad (6)$$

where $c_{q,l}$ is a $q^{th}$ order polynomial coefficient associated with the $l^{th}$ transmission path.

A set of positions of the subcarriers that are allocated with the $N_P$ pilots of the $m^{th}$ one of the frequency-domain transmission symbols $X_m$ is expressed as $$\Omega_P = \{p_i | i=0,1,\ldots,N_P-1; \text{ and } p_i \in [0,N-1]\}, \quad (7)$$

where $p_i$ is a position of one of the subcarriers that is allocated with an $i^{th}$ one of the pilots.

Further, a signal in the $m^{th}$ one of the frequency-domain receive symbols $Y_m$ corresponding to a $\xi^{th}$ one of the pilots in the $m^{th}$ one of the frequency-domain transmission symbols $X_m$ is expressed as Equation (8).

$$Y_m(p_\xi) = F(p_\xi,:) G_m F^{-1} X_m + F(p_\xi,:) w_m \quad (8)$$

$$= \sum_{q=0}^{Q} \sum_{l=0}^{L-1} c_{q,l} \sum_{i=0}^{N_P-1} X_m(p_i) \omega^{p_i \cdot l} \phi_m^q(p_\xi - p_i) +$$

$$I_m(p_\xi) + W_m(p_\xi)$$

In Equation (8), $p_\xi$ is a position of one of the subcarriers allocated with a $\xi^{th}$ one of the pilots, $Y_m(p_\xi)$ is the signal in the $m^{th}$ frequency-domain receive symbol $Y_m$ corresponding to the $\xi^{th}$ pilot in the $m^{th}$ frequency-domain transmission symbol $X_m$, $\xi=0, 1, \ldots, N_P-1$, $\omega$ is a unit complex exponential and is equal to $$e^{-j\frac{2\pi}{N}},$$

$\phi_m^q(p_\xi - p_i)$ is a pilot subcarrier correlation parameter (PSCP), $I_m(p_\xi)$ is a pilot interference associated with the $\xi^{th}$ pilot, and $W_m(p_\xi)$ a noise component associated with the $\xi^{th}$ pilot. The PSCP $\phi_m^q(p_\xi - p_i)$, the pilot interference $I_m(p_\xi)$, and the noise component $W_m(p_\xi)$ are expressed as Equations (9) to (11), respectively.

$$\phi_m^q(p_\xi - p_i) \equiv \frac{1}{N} \sum_{k=0}^{N-1} \omega^{k(p_\xi - p_i)} (k + L - 1 + m(N + L - 1))^q \quad (9)$$

$$I_m(p_\xi) = \sum_{q=0}^{Q} \sum_{l=0}^{L-1} c_{q,l} \sum_{i=0, p_i \notin \Omega_P}^{N-1} X_m(p_i) \omega^{p_i \cdot l} \phi_m^q(p_\xi - p_i) \quad (10)$$

$$W_m(p_\xi) = \sum_{k=0}^{N-1} w_m(k)\omega^{p_\xi k} \quad (11)$$

Since the $m^{th}$ frequency-domain transmission symbol $X_m$ includes the $N_P$ pilots, a pilot receive vector $Yp_m$ can be obtained according to the signal $Y_m(p_\xi)$ in the $m^{th}$ frequency-domain receive symbol $Y_m$ corresponding to the $\xi^{th}$ pilot in the $m^{th}$ frequency-domain transmission symbol $X_m$ if the pilot interference $I_m(p_\xi)$ in the signal $Y_m(p_\xi)$ is omitted. Further, the pilot receive vector $Yp_m$ can be expressed as Equation (12).

$$Yp_m = [B_m^0 B_m^1 \ldots B_m^Q] C_c + Wp_m \quad (12)$$

In Equation (12), the pilot receive vector $Yp_m$ is an $N_p \times 1$ vector and $Yp_m = [Y_p(p_0) \ Y_m(p_1) \ldots Y_m(p_{N_1-1})]^T$, $C_c$ is a polynomial coefficient vector with a vector size $(Q+1)L \times 1$, $B_m^q$ is a $q^{th}$ order pilot channel transform matrix associated with the $m^{th}$ frequency-domain transmission symbol $X_m$ and has a matrix size $N_P \times L$, and $Wp_m$ is a pilot noise vector with a vector size $Ar_P \times 1$ and $Wp_m = [W_m(p_0) \ W_m(p_1) \ldots W_m(p_{N_p-1})]^T$. The polynomial coefficient vector $C_c$ and the pilot channel transform matrix $B_m^q$ are expressed as Equations (13) and (14), respectively.

$$C_c = [c_{0,0} c_{0,1} \ldots c_{0,L-1} c_{1,0} \ldots c_{1,L-1} \ldots c_{q,0} \ldots c_{q,L-1} \ldots c_{Q,0} \ldots c_{Q,L-1}]^T \quad (13)$$

$$B_m^q(\xi, l) = \sum_{i=0}^{N_p-1} X_m(p_i)\omega^{p_i l} \phi_m^q(p_\xi - p_i) \quad (14)$$

In Equation (14), $B_m^q(\xi,l)$ is a matrix element associated with a $\xi^{th}$ row and an $l^{th}$ column of the $q^{th}$ order pilot channel transform matrix $B_m^q$ that is associated with the $m^{th}$ frequency-domain transmission symbol $X_m$.

Since the observation window includes the number M of the frequency-domain transmission symbols $X_0$ to $X_{M-1}$, a window pilot receive vector $Y_c$ can be obtained according to the number M of the pilot receive vectors $Yp_0$ to $Yp_{M-1}$ that correspond to the frequency-domain transmission symbols $X_0$ to $X_{M-1}$, respectively. Further, the window pilot receive vector $Y_c$ can be expressed as Equation (15).

$$Y_c = H_c C_c + W_c \quad (15)$$

In Equation (15), $Y_c$ has a vector size $MN_P \times 1$ and $Y_c = [Yp_0^T \ Yp_1^T \ldots Yp_{M-1}^T]^T$, $H_c$ is a window pilot channel transform matrix with a matrix size $MN_P \times (Q+1)L$, and $W_c$ is a window pilot received noise vector with a vector size $MN_P \times 1$ and $W_c = [W_0^T \ W_1^T \ldots W_{M-1}^T]^T$. The window pilot channel transform matrix $H_c$ can be expressed as Equation (16).

$$H_c = \begin{bmatrix} B_0^0 & B_0^1 & \ldots & B_0^Q \\ B_1^0 & B_1^1 & \ldots & B_1^Q \\ \vdots & \vdots & \ddots & \vdots \\ B_{M-1}^0 & B_{M-1}^1 & \ldots & B_{M-1}^Q \end{bmatrix} \quad (16)$$

Accordingly, an estimated value $\hat{C}_c$ of the polynomial coefficient vector $C_c$ can be obtained based upon Equation (17).

$$\hat{C}_c = H_c^+ Y_c \quad (17)$$
$$= [\hat{c}_{0,0} \ \hat{c}_{0,1} \ldots \hat{c}_{0,L-1} \ \hat{c}_{1,0} \ldots \hat{c}_{1,L-1} \ldots \hat{c}_{q,0} \ldots \hat{c}_{q,L-1} \ldots \hat{c}_{Q,0} \ldots \hat{c}_{Q,L-1}]^T$$

In Equation (17), $H_c^+$ is a pseudo-inverse matrix of the window pilot channel transform matrix $H_c$, and $\hat{c}_{q,l}$ (q=0, 1, ... Q, l=0, 1, ... L−1) is an element of the estimated value of the polynomial coefficient vector $\hat{C}_c$, i.e., an estimated value of the $q^{th}$ order polynomial coefficient $c_{q,l}$ associated with the $l^{th}$ transmission path.

Finally, an estimated value $\hat{g}_m(k,l)$ of the channel response $g_m(k,l)$ of the $m^{th}$ frequency-domain transmission symbol $X_m$ to the $l^{th}$ transmission path can be obtained based upon Equation (6) with the estimated value of the polynomial coefficient $\hat{c}_{q,l}$. The estimated value of the channel response $\hat{g}_m(k,l)$ is computed based upon Equation (18).

$$\hat{g}_m(k, l) = \sum_{q=0}^{Q} \hat{c}_{q,l} k^q \quad (18)$$

In Equation (18), $\hat{g}_m(k,l)$ is the estimated value of the channel response $g_m(k,l)$ of the $m^{th}$ frequency-domain transmission symbol $X_m$ to the $l^{th}$ transmission path. Then, according to the estimated value of the channel response $\hat{g}_m(k,l)$ associated with the frequency-domain transmission symbol $X_m$ an estimated value $\hat{G}_m$ of the time-domain channel matrix $G_m$ (referring to Equation (2)) associated with the frequency-domain transmission symbol $X_m$ can be obtained. Further, depending on the configuration of the MCM system, an estimated value $\hat{H}_m$ of the frequency-domain channel matrix $H_m$ can be also obtained ($\hat{H}_m = F\hat{G}_m F^{-1}$).

Figure 2:
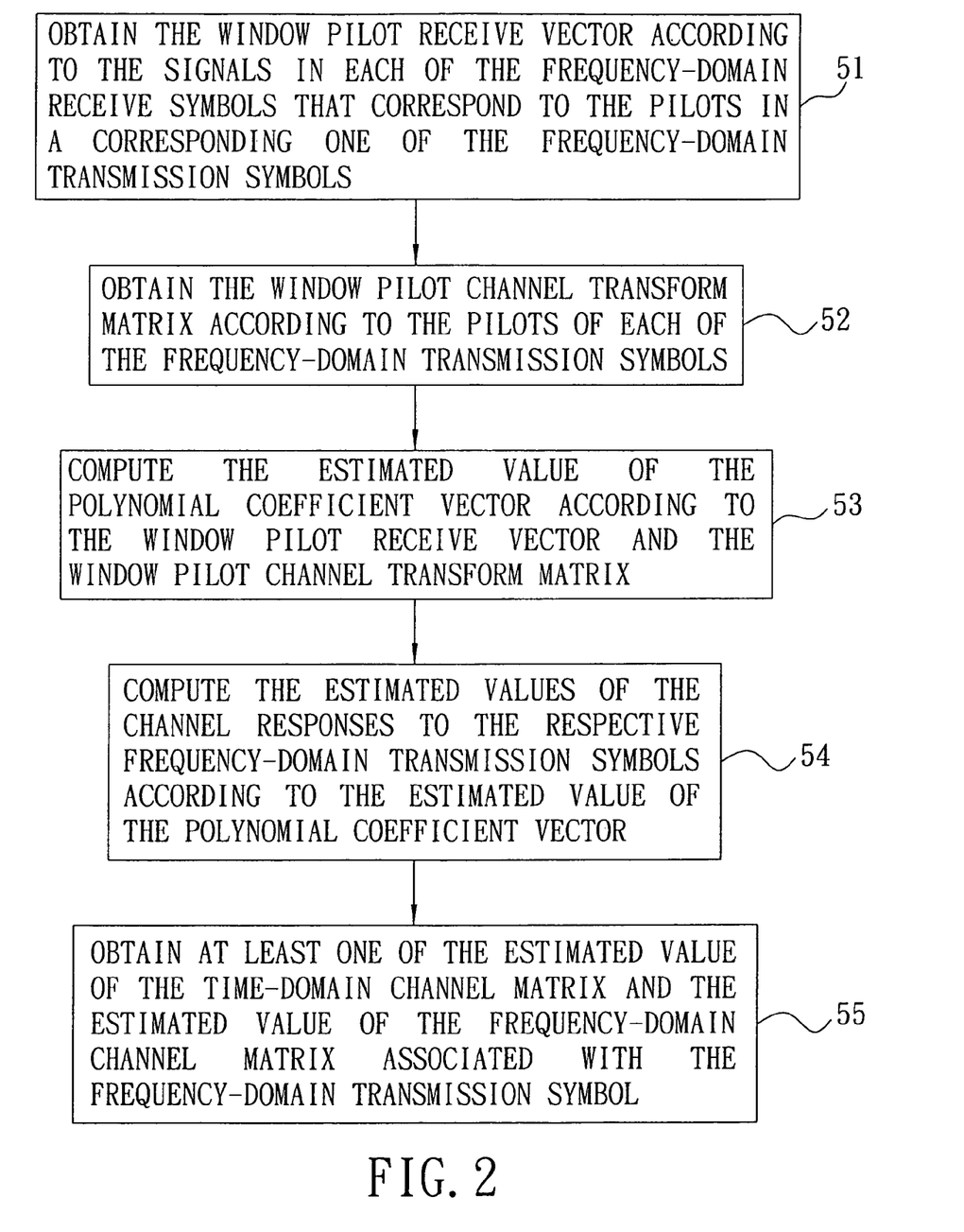
FIG. 2 is a flow chart of a preferred embodiment of a method of multi-symbol channel estimation according to the present invention.

Accordingly, referring to FIGS. 1 and 2, the channel estimation device 40 is configured to implement the method of multi-symbol channel estimation including the following steps. Preferably, a computer program product includes a machine readable storage medium having program instructions stored therein which when executed cause the channel estimation device 40 to perform the method of multi-symbol channel estimation for estimating the channel response.

In step 51, the channel estimation device 40 is operable to receive the frequency-domain receive symbols $Y_0$ to $Y_{M-1}$ from DFT operator 23, and to obtain the window pilot receive vector $Y_c$ according to the signals $Y_m(p_\xi)$ in each of the frequency-domain receive symbols $Y_0$ to $Y_{M-1}$ that correspond to the pilots in a corresponding one of the frequency-domain transmission symbols $X_0$ to $X_{M-1}$, i.e., $Y_c = [Yp_0^T \ Yp_1^T \ldots Yp_{M-1}^T]^T$. It should be noted that, before step 51, the pilots of each of the frequency-domain transmission symbols $X_0$ to $X_{M-1}$ have already been allocated to part of the subcarriers in a random manner, and such pilots and the positions of the pilots are known to the channel estimation device 40.

In step 52, according to the pilots of each of the frequency-domain transmission symbols $X_m$, the channel estimation device 40 is operable, based upon Equation (14), to compute a plurality of pilot channel transform matrices $B_m^q$ (q=0, 1, ..., Q, m=0, 1, ..., M−1) with respective orders that are associated with the $m^{th}$ frequency-domain transmission symbol $X_m$. Then, the channel estimation device 40 is further operable, based upon Equation (16), to obtain the window pilot channel transform matrix $H_c$ according to the pilot channel transform matrices $B_m^q$.

In step 53, the channel estimation device 40 is operable to compute the pseudo-inverse matrix $H_c^+$ of the window pilot channel transform matrix $H_c$ obtained in step 52. Then, according to the pseudo-inverse matrix $H_c^+$ of the window pilot channel transform matrix $H_c$ and the window pilot receive vector $Y_c$ obtained in step 51, the channel estimation device 40 is further operable, based upon Equation (17), to compute the estimated value of the polynomial coefficient vector $\hat{C}_c$.

In step 54, according to the elements $\hat{c}_{q,l}$ of the estimated value of the polynomial coefficient vector computed in step 53, the channel estimation device 40 is operable, based upon Equation (18), to compute the estimated value of the channel response $\hat{g}_m(k,l)$ to each of the frequency-domain transmission symbols $X_m$ associated with the transmission paths in the time-varying channel 30.

In step 55, according to the estimated value of the channel response $\hat{g}_m(k,l)$ associated with each of the frequency-domain transmission symbols $X_m$, the channel estimation device 40 is operable to compute the estimated value of the time-domain channel matrix $\hat{G}_m$ associated with each of the frequency-domain transmission symbols $X_m$. Further, depending on the configuration of the OFDM system 1, the channel estimation device 40 may be also operable to compute the estimated value of the frequency-domain channel matrix $\hat{H}_m$. Then, at least one of the estimated value of the time-domain channel matrix $\hat{G}_m$ and the estimated value of the frequency-domain channel matrix $\hat{H}_m$ is provided to the signal detector 24 for obtaining the estimated value of the frequency-domain transmission symbol $\hat{X}_m$ according to a corresponding one of the frequency-domain receive symbols $Y_0$ to $Y_{M-1}$ in a known manner.

Figure 3:
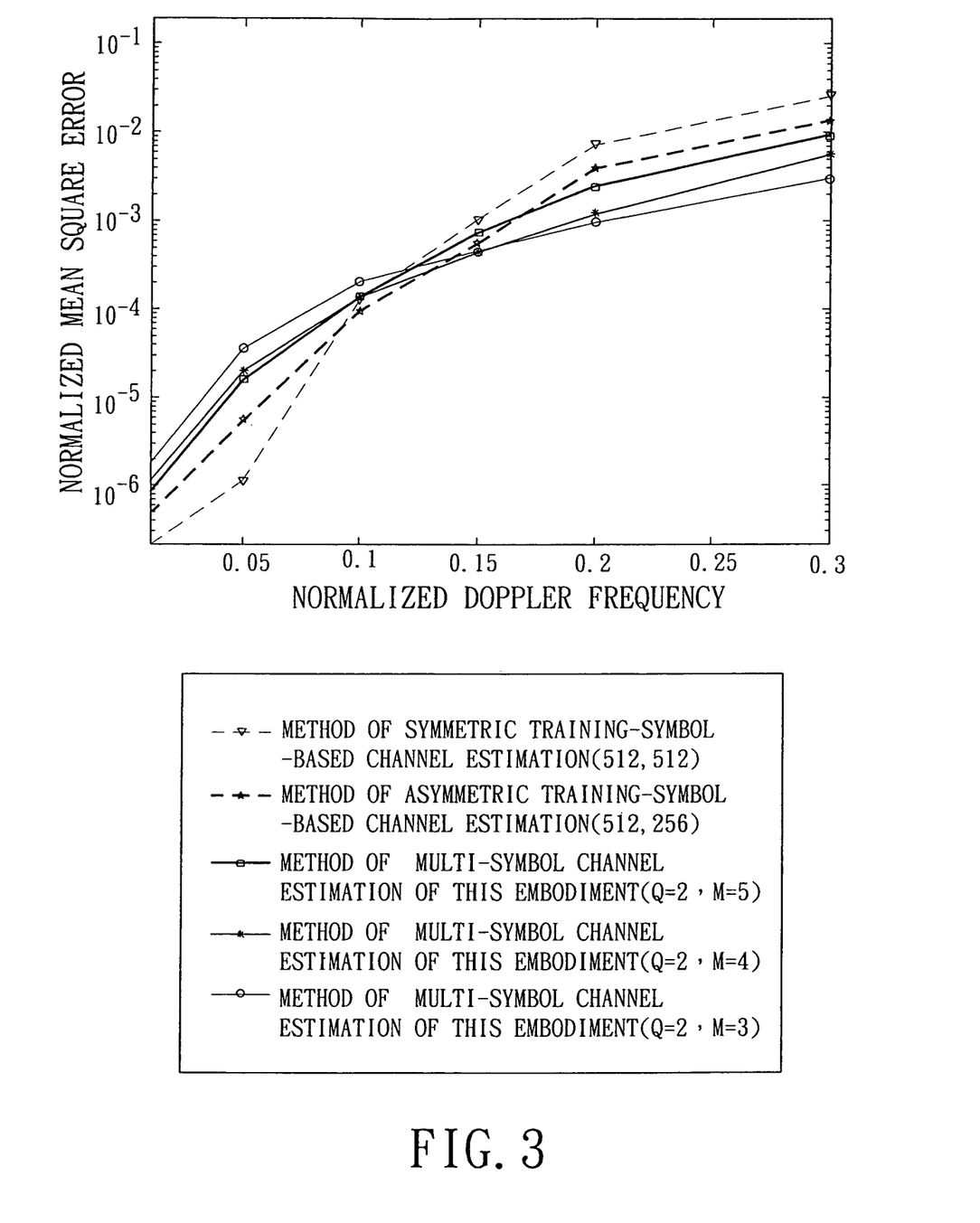
FIG. 3 is a plot comparing normalized mean square error of channel estimation to the COST207 channel with a noise of 45 db and a pilot overhead equal to ¼ using the method of the preferred embodiment and conventional methods.
Figure 4:
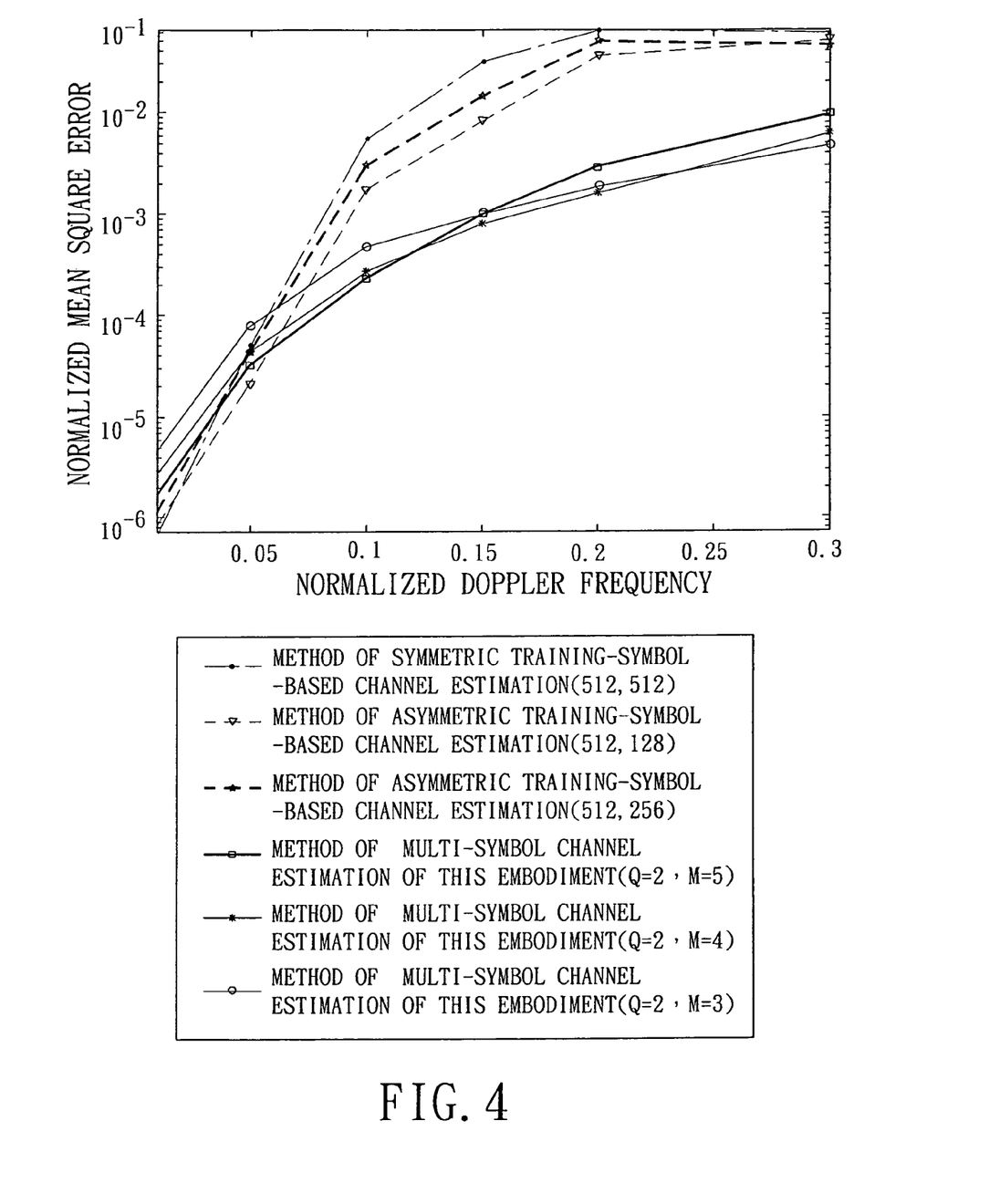
FIG. 4 is a plot comparing normalized mean square error of channel estimation to the COST207 channel with a noise of 45 db and a pilot overhead equal to ⅛ using the method of the preferred embodiment and conventional methods.

FIGS. 3 and 4 are plots illustrating results of channel estimation using the method of multi-symbol channel estimation of this embodiment and conventional methods for the COST207 channel, which was developed by the European Cooperation in Science and Technology (COST), with a noise of 45 dB and different pilot signal overheads.

For each of the plots of FIGS. 3 and 4, a horizontal axis indicates the normalized Doppler frequencies, and a vertical axis indicates values of normalized mean square error (NMSE). When the normalized Doppler frequencies are relatively high, it means that the MCM system (e.g., the OFDM system 1 in this embodiment) is operated under a moving environment with a relatively high speed, for example, a high-speed railway. For the same normalized Doppler frequency, a smaller value of NMSE means a better signal-detecting performance of the MCM system with the method of channel estimation. Generally, a method of channel estimation is practical and is capable of enhancement of the signal-detecting performance of the MCM system when the value of NMSE is smaller than $10^{-3}$.

It should be noted that, when a carrier frequency of the OFDM system 1 (MCM system) is 2.5 GHz, a signal bandwidth thereof is 5 MHz, and a number of the subcarriers is 512, the receiving end 20 of the OFDM system 1 is under a moving environment with a speed of about 40 km/hr while the normalized Doppler frequency is 0.01. With the same condition, the receiving end 20 is under a moving environment with a speed of about 200 km/hr while the normalized Doppler frequency is 0.05, the receiving end 20 is under a moving environment with a speed of about 400 km/hr while the normalized Doppler frequency is 0.1, the receiving end 20 is under a moving environment with a speed of about 600 km/hr while the normalized Doppler frequency is 0.15, and the receiving end 20 is under a moving environment with a speed of about 800 km/hr while the normalized Doppler frequency is 0.2. Regarding a current on-land vehicle, if a method of channel estimation is implemented with the normalized Doppler frequency smaller than 0.1 and the NMSE is smaller than $10^{-3}$, this method of channel estimation is deemed to be practical.

In FIG. 3, when the pilot overhead is equal to ¼, for all of the normalized Doppler frequencies, it can be appreciated that the values of NMSE associated with the method of multi-symbol channel estimation of this embodiment are obviously smaller than the values of NMSE associated with the method of symmetric training-symbol-based channel estimation proposed by Huang-Chang Lee et al. and the values of NMSE associated with the method of asymmetric training-symbol-based channel estimation proposed by Chao-Wei Chen et al.

In FIG. 4, when the pilot overhead is equal to ⅛, it can be appreciated that the values of NMSE associated with the method of multi-symbol channel estimation of this embodiment are still smaller than $10^{-3}$ when the normalized Doppler frequency is greater than 0.1, i.e., a moving environment with a speed greater than 400 km/hr. Therefore, the method of multi-symbol channel estimation of this embodiment is practical under a high-mobility environment.

In summary, according to the above-mentioned experimental data, the method of multi-symbol channel estimation according to this invention has a relatively superior performance when applied to the high-mobility environment (for example, a high-speed rail transportation). The MCM system with the method of multi-symbol channel estimation of this invention generally has relatively greater transmission efficiency with respect to a system with the conventional methods of channel estimation. Moreover, all of the pilots of the transmission symbols $X_m$ within the observation window are considered in the method of multi-symbol channel estimation of this invention so as to estimate the channel response within the observation window effectively. Since a range of the observation window is relatively greater, the results of channel estimation are still accurate under the high-mobility environment. Further, the pilots allocated broadly within the observation window significantly enhance average transmission efficiency of the MCM system with the method of multi-symbol channel estimation of this invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method of multi-symbol channel estimation for estimating channel response to a plurality of transmission symbols within an observation window transmitted through a time-varying channel in a multi-carrier modulation (MCM) system, each of the transmission symbols including a plurality of pilots, said method to be implemented using a channel estimation device that is configured to receive a plurality of receive symbols as a result of transmission of the transmission symbols through the time-varying channel, each of the receive symbols having a plurality of elements, said method comprising the steps of:

a) configuring the channel estimation device to obtain a window pilot receive vector according to a part of the elements of each of the receive symbols that correspond to the pilots in a corresponding one of the transmission symbols;

b) configuring the channel estimation device to compute a window pilot channel transform matrix based upon the pilots in the transmission symbols;

c) configuring the channel estimation device to compute an estimated value of a polynomial coefficient vector based upon the window pilot receive vector obtained in step a) and the window pilot channel transform matrix obtained in step b); and d) for each of the transmission symbols, configuring the channel estimation device to compute a plurality of estimated values of channel response associated with possible transmission paths in the time-varying channel of the MCM system according to the estimated value of the polynomial coefficient vector;

wherein step b) includes the following sub-steps of b1) configuring the channel estimation device to compute a plurality of pilot channel transform matrices according to the pilots in respective ones of the transmission symbols, and b2) configuring the channel estimation device to obtain the window pilot channel transform matrix using the pilot channel transform matrices computed in sub-step b1) as matrix elements of the window pilot channel transform matrix;

wherein each of the transmission symbols is allocated to a plurality of subcarriers, and, in sub-step b1), the channel estimation device is configured to compute the pilot channel transform matrices based upon $$B_m^q(\xi, \lambda) = \sum_{i=0}^{N_p-1} X_m(p_i)\omega^{p_i \cdot \lambda} \phi_m^q(p_\xi - p_i), \text{ and}$$

$$\phi_m^q(p_\xi - p_i) = \frac{1}{N} \sum_{k=0}^{N-1} \omega^{k(p_\xi - p_i)}(k + L - 1 + m(N + L - 1))^q,$$

where each of the pilot channel transform matrices has a plurality of rows corresponding to positions of the pilots in the transmission symbols, and a plurality of columns corresponding to the transmission paths in the time-varying channel, m is a positive integer ranging from 0 to M−1 and M is a number of the transmission symbols, q is a positive integer ranging from 0 to Q−1 and Q is an order of a polynomial associated with the channel response, $\xi$ and i are equal to 0 to $N_p-1$ and $N_p$ is a number of the pilots in each of the transmission symbols, $\lambda$ is a positive integer ranging from 0 to L−1 and L is a number of the transmission paths in the time-varying channel, $B_m^q(\epsilon, \lambda)$ is a matrix element associated with a $\xi^{th}$ row and an $\lambda^{th}$ column of a $q^{th}$ order pilot channel transform matrix that is associated with an $m^{th}$ one of the transmission symbols, $\phi_m^q(p_\xi - p_i)$ is a pilot subcarrier correlation parameter, $p_i$ and $p_\xi$ are respective positions of the subcarriers allocated with $i^{th}$ and $\xi^{th}$ ones of the pilots, $X_m(p_i)$ is an $i^{th}$ one of the pilots in an $m^{th}$ one of the transmission symbols, and $\omega$ is a unit complex exponential and is equal to $$e^{-j\frac{2\pi}{N}}.$$

2. The method as claimed in claim 1, further comprising the following step of:

e) for each of the transmission symbols, configuring the channel estimation device to obtain, according to the estimated values of channel response corresponding to one of the transmission symbols, at least one of an estimated value of a time-domain channel matrix and an estimated value of a frequency-domain channel matrix that are associated with said one of the transmission symbols.

3. The method as claimed in claim 1, wherein, in sub-step b2), the channel estimation device is configured to compute the window pilot channel transform matrix $H_c$ based upon $$H_c = \begin{bmatrix} B_0^0 & B_0^1 & \Lambda & B_0^Q \\ B_1^0 & B_1^1 & \Lambda & B_1^Q \\ M & M & O & M \\ B_{M-1}^0 & B_{M-1}^1 & \Lambda & B_{M-1}^Q \end{bmatrix},$$

where $B_m^q$ is the $q^{th}$ order pilot channel transform matrix associated with the $m^{th}$ one of the transmission symbols.

4. The method as claimed in claim 1, wherein, in step c), the channel estimation device is configured to compute the estimated value of the polynomial coefficient vector based upon the window pilot receive vector and a pseudo-inverse matrix of the window pilot channel transform matrix.

5. The method as claimed in claim 4, wherein, in step c), the channel estimation device is configured to compute the estimated value of the polynomial coefficient vector based upon $\hat{C}_c H_c^+ Y_c$, where $\hat{C}_c$ is the estimated value of the polynomial coefficient vector, $H_c^+$ is the pseudo-inverse matrix of the window pilot channel transform matrix $H_c$, and $Y_c$ is the window pilot receive vector.

6. The method as claimed in claim 1, each of the transmission symbols being allocated to a plurality of subcarriers, wherein, in step d), the channel estimation device is configured to compute the estimated values of the channel response to the transmission symbols associated with the possible transmission paths based upon $$\hat{g}_m(k, \lambda) = \sum_{q=0}^{Q} \hat{c}_{q,\lambda} k^q,$$

where m is a positive integer ranging from 0 to M−1 and M is a number of the transmission symbols, Q is an order of a polynomial associated with the channel response, $\lambda$ is a positive integer ranging from 0 to L−1 and L is a number of the transmission paths in the time-varying channel, k is a positive integer ranging from 0 to N−1 and N is a number of the subcarriers, $\hat{g}_m(k, \lambda)$ is an estimated value of the channel response to an $m^{th}$ one of the transmission symbols associated with an $\lambda^{th}$ one of the transmission paths in the time-varying channel, and $\hat{c}_{q,\lambda}$ is a coefficient in the estimated value of the channel response associated with a $q^{th}$ power term and an $\lambda^{th}$ one of the transmission paths in the time-varying channel.

7. The method as claimed in claim 1, wherein each of the transmission symbols is allocated to a plurality of subcarriers, and the pilots in each of the transmission symbols are allocated to a part of the subcarriers in a random manner.

8. A computer program product comprising a machine readable non-transitory storage medium having program instructions stored therein which when executed cause a computer to perform a method of multi-symbol channel estimation according to claim 1 for estimating channel response to a plurality of transmission symbols within an observation window transmitted through a time-varying channel in a multi-carrier modulation system.

* * * * *